(12) United States Patent
Velthaus (10) Patent No.: US 9,310,663 B2
(45) Date of Patent: Apr. 12, 2016

(54) MACH-ZEHNDER MODULATOR ARRANGEMENT AND METHOD FOR OPERATING A MACH-ZEHNDER MODULATOR ARRANGEMENT

(71) Applicant: FRAUNHOFER-GESELLSCHAFT ZUR FÖRDERUNG DER ANGEWANDTEN FORSCHUNG E.V., München (DE)

(72) Inventor: Karl-Otto Velthaus, Kleinmachnow (DE)

(73) Assignee: FRAUNHOFER-GESELLSCHAFT ZUR FÖRDERUNG DER ANGEWANDTEN FORSCHUNG E.V., München (DE)

( * ) Notice: Subject to any disclaimer, the term of this patent is extended or adjusted under 35 U.S.C. 154(b) by 0 days.

(21) Appl. No.: 14/371,954

(22) PCT Filed: Jan. 10, 2013

(86) PCT No.: PCT/EP2013/050404
§ 371 (c)(1),
(2) Date: Jul. 11, 2014

(87) PCT Pub. No.: WO2013/104715
PCT Pub. Date: Jul. 18, 2013

(65) Prior Publication Data
US 2015/0043865 A1    Feb. 12, 2015

(30) Foreign Application Priority Data
Jan. 12, 2012   (EP) .................................... 12150994

(51) Int. Cl.
*G02F 1/035*       (2006.01)
*G02F 1/225*       (2006.01)
(Continued)

(52) U.S. Cl.
CPC .............. *G02F 1/225* (2013.01); *G02F 1/0121* (2013.01); *G02F 1/2255* (2013.01); *G02F 1/2257* (2013.01); *G02F 1/25* (2013.01); *G02F 2001/212* (2013.01); *G02F 2201/126* (2013.01)

(58) Field of Classification Search
CPC ......... G02F 1/126; G02F 1/0121; G02F 1/25; G02F 1/225; G02F 1/2255; G02F 1/2257; G02F 2001/212; G02F 2201/126
USPC ........................................ 385/1-3, 14, 40, 50
See application file for complete search history.

(56) References Cited

U.S. PATENT DOCUMENTS

| | | | |
|---|---|---|---|
| 2005/0047703 A1* | 3/2005 | Mitomi et al. | 385/2 |
| 2005/0123242 A1* | 6/2005 | Walker et al. | 385/40 |
| 2006/0115226 A1 | 6/2006 | Miyazaki et al. | |

FOREIGN PATENT DOCUMENTS

| | | |
|---|---|---|
| EP | 1 418 461 A2 | 5/2004 |
| WO | 03/062914 A1 | 7/2003 |

OTHER PUBLICATIONS

J. Godin et al., "InP DHBT Very Hight Speed Power-DACs for Spectrally Efficent Optical Transmission Systems" Compound Semiconductor Integrated Circuit Symposium (CSICS), IEEE, Oct. 16-19, 2011.

(Continued)

*Primary Examiner* — Akm Enayet Ullah
*Assistant Examiner* — Michael Mooney
(74) *Attorney, Agent, or Firm* — Maschoff Brennan (57) ABSTRACT

A Mach-Zehnder modulator arrangement includes at least one electro-optic Mach-Zehnder modulator having a first optical waveguide forming a first modulator arm and a second optical waveguide forming a second modulator arm. A travelling wave electrode arrangement includes first waveguide electrodes for applying a voltage across the first optical waveguide and second waveguide electrodes for applying a voltage across the second optical waveguide. The first waveguide electrodes are capacitively coupled to the second waveguide electrodes. A driver unit supplies an alternating voltage to the travelling wave electrode arrangement. The driver unit includes a first output port coupled to the first waveguide electrodes and a second output port coupled to the second waveguide electrodes. The driver unit supplies a first varying signal to the first waveguide electrodes via the first output port and a second varying signal to the second waveguide electrodes via the second output port.

14 Claims, 6 Drawing Sheets

(51) Int. Cl.
 *G02F 1/25* (2006.01)
 *G02F 1/01* (2006.01)
 *G02F 1/21* (2006.01)

(56) References Cited

OTHER PUBLICATIONS

H. Yasaka et al., "Advances in InP Mach-Zehnder modulators for large capacity photonic network systems" Indium Phosphide and Related Materials, 2008. IPRM 2008. 20th International Conference on, May 25-29, 2008.

T. Yamase et al., "10-Gb/s in-line centipede electrode InP MZM and low-power CMOS driver with quasi-traveling wave generation" OptoeElectronics and Communications Conference (OECC), 2011 16th, Jul. 4-8, 2011.

D. Hoffman et al., "45 GHz bandwidth travelling wave electrode Mach-Zehnder modulator with integrated spot size converter" Indium Phosphide and Related Materials, 2004. 16th IPRM. 2004 International Conference on, May 31 to Jun. 4, 2004.

T. Sakamoto et al., "Electro-Optic Ultra-Flat Comb Generation Using Mach-Zehnder Modulator in Push-Pull Operation Mode" Lasers and Electro-Optics Society, 2007. LEOS 2007. The 20th Annual Meeting of the IEEE, Oct. 21-25, 2007.

K.O. Velthaus et al., "High performance InP-based Mach-Zehnder modulators for 10 to 100 Gb/s optical fiber transmission systems" Compound Semiconductor Week (CSW/IPRM), 2011 and 23rd International Conference on Indium Phosphide and Related Materials, May 22-26, 2011.

Robert G. Walker, "High-Speed III-V Semiconductor Intensity Modulators", IEEE Journal of Quantum Electronics, vol. 27, Issue 3, Mar. 1991, pp. 654-667.

* cited by examiner

FIG 2 PRIOR ART

PRIOR ART

MACH-ZEHNDER MODULATOR ARRANGEMENT AND METHOD FOR OPERATING A MACH-ZEHNDER MODULATOR ARRANGEMENT

CROSS-REFERENCE TO A RELATED APPLICATION

This application is a National Phase Patent Application of International Patent Application Number PCT/EP2013/050404, filed on Jan. 10, 2013, which claims priority of European Patent Application Number 12150994.7, filed on Jan. 12, 2012.

BACKGROUND

The invention relates to an electro-optic Mach-Zehnder modulator arrangement and a method for operating a Mach-Zehnder modulator arrangement.

It is known in the art to use Mach-Zehnder interferometers as electro-optic modulators in optical high-speed transmission systems, wherein, for example, coplanar travelling wave electrodes (TWE) are used to induce a phase shift in the interferometer arms. These TWEs comprise a first and a second coplanar microwave line connected to a plurality of periodically arranged and capacitively coupled electrodes on top of the waveguides. Examples of such TWE-Mach-Zehnder modulators are described in the publication "High-Speed III-V Semiconductor Intensity Modulators", Robert G. Walker, IEEE Journal of Quantum Electronics Vol. 27, No. 3, March 1991.

Usually, a high frequency (e.g. >20 GHz) data signal is supplied to the Mach-Zehnder modulator via an amplifying driver, wherein a signal carrying connector of the driver is connected to one of the coplanar lines of the TWE, whereas the other coplanar line is grounded (single drive operation). Further, the impedance of the travelling wave electrode of the modulator is matched to the conventional 50 Ohm impedance of the output port of the driver. However, this asymmetric operation of the TWE creates stray capacitances against ground which may, for example, cause drops in the frequency response of the Mach-Zehnder modulator due to parasitic electrical modes.

In order to eliminate stray capacitances a complicated layout of the high frequency interface between the electric input port of the modulator and the coplanar line of the modulator as well as a complicated grounding of the modulator module is required. For example, the modulator housing is arranged at a great distance (for example, several millimeters) from the TWE.

Further, the publication "Advances in InP Mach-Zehnder modulators for large capacity photonic network systems", H. Yasaka et al., Indium Phosphide and Related Materials, IPRM 2008, p. 1, discloses a Mach-Zehnder modulator having separate (electrically uncoupled) continuous electrodes disposed on the optical waveguides, wherein the electrodes are driven by two 50 Ohm drivers requiring twice the voltage of the capacitively coupled TWE.

SUMMARY

It is an object of the invention to provide a highly efficient Mach-Zehnder modulator that nevertheless can be fabricated in a cost effective way.

According to an exemplary embodiment of the invention, an electro-optic Mach-Zehnder modulator arrangement is provided, comprising an electro-optic Mach-Zehnder modulator comprising a first optical waveguide forming a first modulator arm and a second optical waveguide forming a second modulator arm;
a travelling wave electrode arrangement comprising a plurality of first waveguide electrodes for applying a voltage across the first optical waveguide and a plurality of second waveguide electrodes for applying a voltage across the second optical waveguide, wherein the first waveguide electrodes are capacitively coupled to the second waveguide electrodes; and
a driver unit for supplying an alternating voltage to the travelling wave electrode arrangement, wherein
the driver unit comprises a first output port coupled to the first waveguide electrodes and a second output port coupled to the second waveguide electrodes, wherein the driver unit is configured to supply a first varying signal to the first waveguide electrodes via the first output port and to supply a second varying signal to the second waveguide electrodes via the second output port.

For example, a non-grounded (or at least not permanently grounded) signal-carrying connector of the first output port is connected to the first waveguide electrodes and a non-grounded (or at least not permanently grounded) signal-carrying connector of the second output port is connected to the second waveguide electrodes to supply the first and the second signal (in particular in the form of a voltage signal), respectively.

The waveguide electrodes may be operated similar to electrical lines used for differential signaling. For example, the first waveguide electrodes and the second waveguide electrodes are driven symmetrically, i.e. the absolute value (e.g. the absolute value of a voltage swing of a high frequency voltage applied between the first and the second waveguide electrode) supplied to the first electrodes is identical to the absolute value of the voltage supplied to the second electrodes. In particular, supplying a signal (a voltage) to both electrodes may have the advantage over the conventional asymmetric electrode operation (by means of a grounded first or second waveguide electrode) that stray capacitance against ground (mass) and thus parasitic electrical modes can be avoided or reduced such that a complicated grounding layout is not necessary. Also, the grounding design does not have to be completely reconsidered when changing the module design.

The Mach-Zehnder modulator arrangement according to the invention further may permit the driver unit and/or the Mach-Zehnder modulator to comprise a grounded (e.g. metal) carrier, i.e. circuitry of the driver unit (implementing, for example, the first and the second output port) may be arranged on a grounded (e.g. metal) carrier. The semiconductor substrate used for arranging the optical and electrical Mach-Zehnder modulator structures (such as the optical waveguides) may still be arranged on an insulating carrier.

For example, the driver unit is a differential driver unit configured in such a way that the first signal (electrical potential), e.g. a first RF signal voltage, and the second signal, e.g. a second RF signal voltage, supplied to the first and the second waveguide electrodes, respectively, have opposite polarity but the same absolute value (bipolar operation). Using this kind of differential drive operation half of the required driving voltage $V_\pi$ is to be supplied to the first and the second waveguide electrodes, respectively. Thus, in contrast to the conventional single drive operation, the driver unit does not have to be configured to be able to deliver the full required driving voltage. For example, the on-off-keying format requires a driving voltage $V_\pi$ of about 2-2.5 V, wherein a phase modulation format even requires a driving voltage of $2 \times V_\pi$, i.e. about 4-5 V. Such voltages often require multistage drivers. Using the modulator arrangement according to the invention, a driving voltage of only $+V_\pi/2$ may be supplied to the first waveguide electrodes and a driving voltage of $-V_\pi/2$ may be supplied to the second waveguide electrodes (or the other way round, $-V_\pi/2$ to the first waveguide electrodes and $+V_\pi/2$ to the second waveguide electrodes).

It is noted that in some differential driver regimes the (e.g. RF) drive voltage is used in a switching mode—the output potential gets switched from one output to the other to drive either a logical "one" or a "zero" respectively. Regarding the absolute RF voltage swing there is no difference to already described approach with dual polarity. Thus, it is possible to supply a first signal (non-zero potential) to the first waveguide electrodes while the second electrodes are on ground (zero) potential during a first period of time and to supply a second, non zero signal (potential) to the second waveguide electrodes while the first waveguide electrodes are on ground potential during a second period of time. In other words, the first and second waveguide electrodes may be driven corresponding to the "low-voltage differential signaling"—LVDS—scheme.

For example, a first driver unit stage (comprising the first output port) of the driver unit is configured to deliver an output voltage of about 1-1.25 V and a second driver unit stage (comprising the second output port) is configured to deliver an output voltage of also about 1-1.25 V. The low required output voltages, for example, may further permit the driving unit to be fabricated using SiGe substrates (using a BiCMOS process, for example) instead of GaAs substrates.

It is noted that the Mach-Zehnder modulator arrangement may comprise a plurality (for example, two) Mach-Zehnder modulators, wherein the signal carrying first and second waveguide electrodes of the modulators may reduce crosstalk between adjacent modulators such that a higher "modulator density" may be realized. For example, an arrangement comprising multiple Mach-Zehnder modulators may be used for quadrature amplitude modulation systems. Also, the arrangement according to the invention may be used in photonic ICs (PICs), e.g. OFDM (Orthogonal frequency-division multiplexing) PICs.

According to an exemplary embodiment of the invention, the impedance of the driver unit at each one of the two output ports (i.e. the impedance of the first and second driver stage producing the voltage supplied to first and the second waveguide electrodes via the first and the second output port) is at least essentially half of the impedance of the travelling wave electrode arrangement.

For example, the impedance of the travelling wave electrode arrangement is in the range between approximately 46 to approximately 54 Ohm or is approximately 50 Ohm such that the impedance of the driver unit at the first output port is about 23 to 27 Ohm or about 25 Ohm and at the second output port also about 23 to 27 Ohm or about 25 Ohm. Of course, other impedances could be used, wherein the impedance at the driver output ports may be adapted to the impedance of the design of the travelling waveguide electrodes.

The driver unit, however, may comprise an input port having an impedance of approximately 50 Ohm such that the input port can be connected to conventional 50 Ohm equipment.

It is noted that all conventional high frequency components such as drivers, cables and plugs have the standard 50 Ohm impedance such that all conventional driver-modulator units are restricted to a 50 Ohm layout, wherein a first signal carrying connector of an output port of the driver is connected to the first waveguide electrodes of the modulator and a second grounded connector of the driver is connected to the second waveguide electrodes such that the known 50 Ohm infrastructure only permits a very inefficient 2×50 Ohm=100 Ohm design of the modulator.

It is further noted that a conventional symmetrical differential drive operation comprises a ground contact between the two waveguide electrodes (for example, an electrode connected to a ground connector of the driver), which is not necessarily required in the Mach-Zehnder modulator arrangement according to the invention.

According to an exemplary embodiment of the invention, the modulator is capacitively coupled, which means in particular that the waveguide electrodes with respect to an RF voltage applied to the electrodes are coupled via a conductive region (for example, an n-doped region) located between them (as explained in more detail below). Driving the waveguide electrodes symmetrically (for example, using a bipolar differential signal or a switched unipolar RF signal similar to the differential scheme used in the LVDS standard as set forth above) may have the effect that the potential relative to ground of the conductive region does not change during operation of the modulator. Thus, if a capacitance occurs between the conductive region and ground, this capacitance will not be loaded or unloaded by the RF voltage applied to the waveguide electrodes such that a stray capacitance between the conductive region and ground affecting the electro-optical characteristics of the modulator may be avoided. In the conventional, asymmetric electrode operation the conductive region between the waveguide electrodes has a "floating" potential, i.e. a potential that varies with the applied RF voltage. Subsequently, a capacitance occurring between the conductive region and ground may be loaded and unloaded during RF operation and thus may form a stray capacitance impairing the electro-optical performance of the modulator.

Thus, the conductive region may have a constant or nearly constant potential (which may be ground potential or nearly ground potential) because of the symmetric drive, but, for example, there is no connection (at least no direct connection) between the conductive region and the ground of the driver unit) such that the conductive region may be "non-grounded". It is noted, however, that a DC-source may be used to bias the conductive region (see below), wherein it may be possible to bias the conductive region in such a way that it assumes ground potential (by setting the DC voltage to zero). However, in intended operation of the Mach-Zehnder modulator arrangement the bias voltage will not be set to zero such that in intended operation the conductive region is "non-grounded". In particular, "non-grounded" means that the conductive region is not connected to ground via the driver unit, i.e. there is no electrical connecting means (such as a wire or another electrically conductive element) arranged between the conductive region and a ground contact (e.g. a ground connector) of the driver unit. Further, for example, the Mach-Zehnder-modulator and the driver unit form a unit, wherein there is no connection between the conductive region and the mass of this unit, i.e. there is no internal (within the unit formed by the Mach-Zehnder-modulator and the driver unit) connection (no "on-chip"-connection) of the conductive region to ground, although the conductive region may be set to ground potential using a DC-source, which, however, is located external to the unit formed by the modulator and the driver unit.

According to another exemplary embodiment of the invention, the Mach-Zehnder modulator comprises a first and a second electrical line extending at least partially parallel to the first and second optical waveguide. In particular, the first and the second output port of the driver unit are coupled to the plurality of first and second waveguide electrodes via the first and second electrical line, respectively. Further, the first and the second electrical line may be formed as coplanar microwave strip lines, i.e. the modulator electrodes have a coplanar stripline (CPS) travelling wave design, wherein, however, none of the coplanar lines is permanently grounded.

An example of a possible principal optical and electrical layout of the Mach-Zehnder modulator of the arrangement according to the invention is described in the publication "45 GHz Bandwidth Travelling Wave Electrode Mach-Zehnder Modulator with Integrated Spot Size Converter", D. Hoffmann, Proceedings International Conference on Indium Phosphide and Related Materials, p. 585, 2004, wherein the content of this article in respect to the optical and electrical design of the Mach-Zehnder modulator is incorporated by reference herewith. It is noted, however, that the invention is of course not restricted to a particular basic design of the Mach-Zehnder modulator. For example, the optical waveguides could also be formed as strongly guiding ("deep ridge") waveguides as disclosed in U.S. patent application Ser. No. 12/638,372 (published as US 2010/0150494 A1) and in the article "High performance InP-based Mach-Zehnder modulators for 10 to 100 Gb/s optical fiber transmission systems", K.-O. Velthaus et al., Compound Semiconductor Week and 23rd International Conference on Indium Phosphide and Related Materials, CSW/IPRM 2011, which are also incorporated by reference herewith.

The impedance of the travelling wave electrode arrangement depends on the design of the electrodes such as the design of the waveguide electrodes (e.g. their length, number and the space between the waveguide electrodes) and the design of the coplanar lines connected to the waveguide electrodes.

According to another example of the invention, the first and/or the second output port of the driver unit are connected to the first or second electrical line via an adapted RF connecting waveguide, e.g. a microstrip line (each of the RF connecting waveguidess, for example, having an impedance of about half of the impedance of the TWE electrodes, e.g. about 25 Ohm). Further, the RF connecting waveguides (e.g. the microstrip lines) may be short lines (having a length of e.g. not more than 10 mm) such that the driver unit is positioned in proximity of the travelling wave electrodes. In particular, the RF connecting waveguides may extend in the interior of a housing of the Mach-Zehnder-modulator arrangement (such that no 25 Ohm feed throughs are required).

It is also possible that the driver unit (i.e. its first and second output port) are directly connected to the first and second electrical line of the modulator, i.e. without using an electrical (microstrip) line between the output ports and the electrical lines of the modulator, e.g. the connection is realized by a bonding material, only. The driver unit and the Mach-Zehnder-modulator may also be arranged in a common housing but may be disposed, for example, on different substrates consisting of different materials (hybrid integration). However, the driver unit may also be arranged outside a modulator housing.

Moreover, the first and the second waveguide electrodes may be arranged on top of capacitive segments of the optical waveguides, wherein the capacitive segments of the first optical waveguide, for example, are coupled to the capacitive segments of the second optical waveguide via a conductive region as already set forth above, the conductive region being, for example, arranged on a side of the capacitive segments that faces away from the waveguide electrodes. Thus, the waveguide electrodes are capacitively coupled to one another via the connected capacitive segments.

For example, the Mach-Zehnder modulator of the arrangement according to the invention is formed as a semi-conductor device, wherein the conductive region is formed by an n-doped semiconductor layer. In particular, the Mach-Zehnder modulator is fabricated using indium phosphide or gallium arsenide technology, i.e. the modulator is fabricated on an indium phosphide or a gallium arsenide substrate. For example, the capacitive segments of the modulator arms comprise a p-doped layer, wherein the p-doped layer can be removed between adjacent capacitive segments (the active sections of the waveguides) in order to electrical isolate the active sections from each other and reduce the optical loss in the waveguide sections between the capacitive segments (i.e. in the passive sections of the waveguides).

The p-doped layer in the capacitive segments may form part of a p-i-n-diode, wherein the isolating region of the p-i-n-diode is formed by at least one isolating layer arranged between the p-doped layer and an n-doped layer or an n-doped substrate. It is, however, also possible that other kinds of diodes realize the capacitive segments such as n-i-n diodes and/or Schottky diodes.

According to another example, the Mach-Zehnder modulator arrangement comprises a DC-source connected to the first and/or the second (e.g. coplanar) electrical line and the conductive region for supplying a bias voltage across the capacitive segments, in particular to bias the diodes of the capacitive segments in reverse direction. According to another example of the invention, the DC-source is connected to the first and/or the second waveguide electrodes via a connecting point located between two terminating resistors coupled between the first and the second waveguide electrode. This has the effect that a photo current created in the region of the capacitive segments will flow across both terminating resistors such that the DC voltage across the terminating resistors will be the same, thereby eliminating or reducing a contribution of a chirp of the optical signal generated by the Mach-Zehnder modulator.

Moreover, the Mach-Zehnder modulator arrangement may comprise at least one digital-to-digital converter, at least one digital-to-analog converter and/or at least one field programmable gate array component, the digital-to-digital converter, the digital-to-analog converter or the field programmable gate array component being connected to the driver unit or implementing the driver unit. For example, a "power DAC" as described in the article "InP DHBT Very High Speed Power-DACs for Spectrally Efficient Optical Transmission Systems", J. Godin, Compound Semiconductor Integrated Circuit Symposium (CSICS), 2011 IEEE (incorporated by reference herewith), may implement the driver unit or may be used to provide an input signal supplied to the driver unit.

The invention also relates to a method for operating a Mach-Zehnder modulator arrangement, in particular as described above, the method comprising the steps of:
  providing at least one electro-optic Mach-Zehnder modulator comprising a first optical waveguide forming a first modulator arm and a second optical waveguide forming a second modulator arm;
  providing a travelling wave electrode arrangement comprising a plurality of first waveguide electrodes for applying a voltage across the first optical waveguide and a plurality of second waveguide electrodes for applying a voltage across the second optical waveguide, wherein the first waveguide electrodes are capacitively coupled to the second waveguide electrodes; and supplying a first varying signal to the first waveguide electrodes and supplying a second varying signal to the second waveguide electrodes.

In particular, a differential driver unit is used for supplying a first voltage signal to the first waveguide electrodes and a second (inverse) voltage signal to the second waveguide electrodes as already set forth above.

BRIEF DESCRIPTION OF THE DRAWINGS

Embodiments of the invention will be described in more detail hereinafter with reference to the drawings.

DETAILED DESCRIPTION

Figure 1:
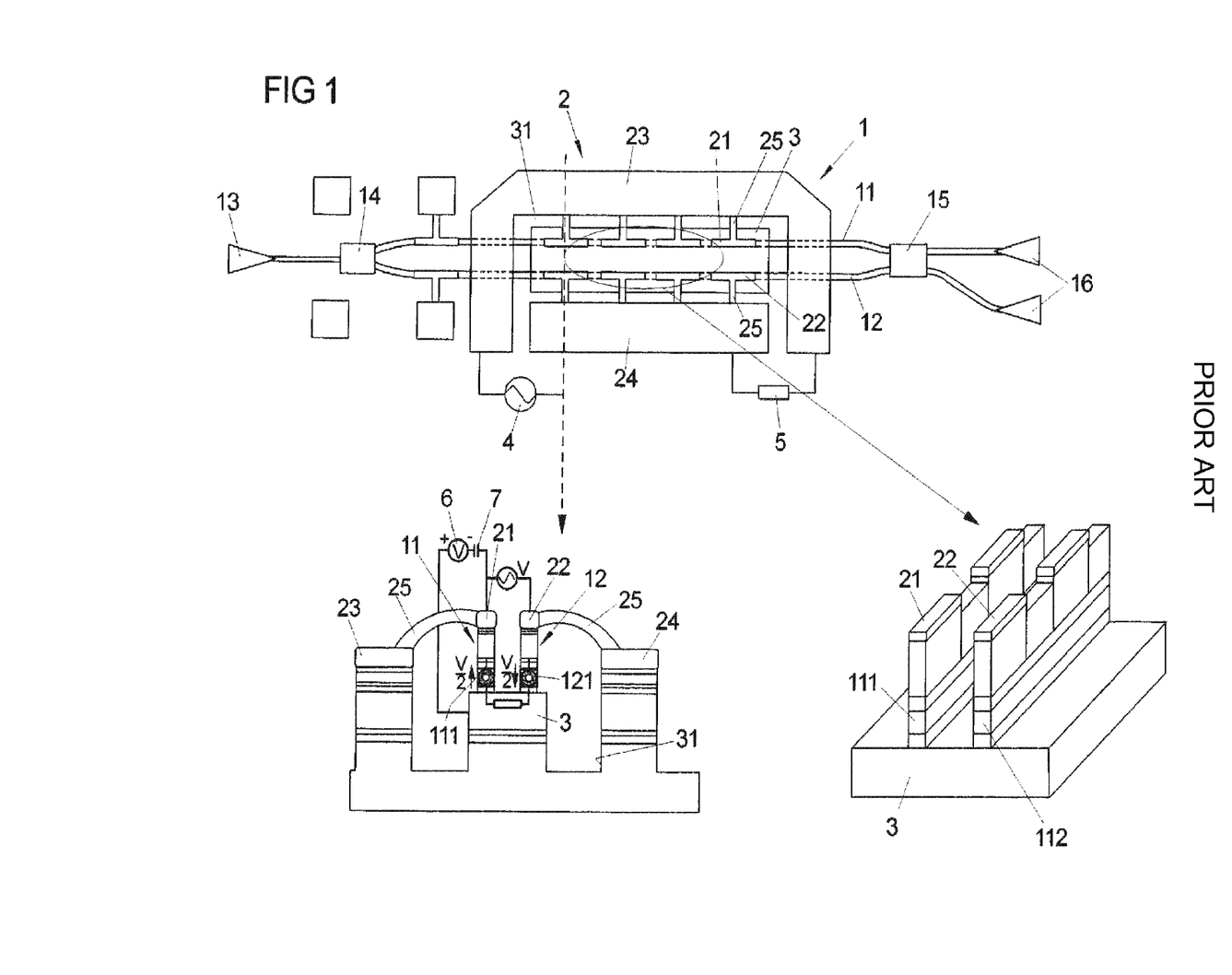
FIG. 1 illustrates the principal layout of a known Mach-Zehnder modulator.

FIG. 1 shows the principal layout of a prior art coplanar stripline travelling wave Mach-Zehnder modulator 1 as disclosed, for example, in the publication "45 GHz Bandwidth Travelling Wave Electrode Mach-Zehnder Modulator with Integrated Spot Size Converter", D. Hoffmann, Proceedings International Conference on Indium Phosphide and Related Materials, p. 585, 2004, already mentioned above. The Mach-Zehnder modulator 1 comprises a first and a second optical waveguide 11, 12, wherein an optical input port of the modulator 1 comprises a spot size converter 13 and a splitter 14 that distributes the optical power inserted via the input port to the first and the second optical waveguide 11, 12.

At the output side, the first and the second optical waveguide 11, 12 are merged in a combiner 15 (for example, realized by a multi mode interference—MMI device). The output port also comprises spot size converters 16 connected to output ports of the combiner 15.

Further, the Mach-Zehnder modulator 1 comprises a travelling wave electrode arrangement 2 that comprises a plurality of first waveguide electrodes 21 and a plurality of second waveguide electrodes 22 for applying a voltage V supplied by a high frequency voltage source 4 across the first and the second optical waveguide 11, 12. The first and second waveguide electrodes 21, 22 are arranged periodically (with a distance from one another) on top of the first and the second optical waveguide 11, 12, respectively. The travelling wave electrode arrangement 2 further comprises two coplanar microwave (e.g. microstrip) lines 23, 24 extending at least partially parallel to the first and the second optical waveguide 11, 12. The first and the second coplanar line 23, 24 are connected to the first and second waveguide electrodes 21, 22 via a plurality of air bridges 25. Thus, the first electrodes 21 are connected to one another via the first coplanar line 23 and the second electrodes 22 are connected to one another via the second coplanar line 24.

The first and second waveguide electrodes 21, 22 are arranged on first and second capacitive segments 111, 121 of the first and the second optical waveguide 11, 12, wherein the capacitive segments 111, 121 are formed by p-i-n diode sections of the optical waveguides 11, 12. An active layer (for example, a multi quantum well layer) forms the intrinsic region, a p-doped region above the intrinsic region the p-region and an n-doped layer below the active layer and arranged on a semi-isolating substrate (e.g. an InP-substrate) the n-region of the diodes.

The capacitive segments 111, 121 are coupled in series (indicated by the resistor symbol in the lower left sectional view of FIG. 1) via an n-doped region 3 (conductive region) formed by a portion of the n-doped layer such that the first and the second waveguide electrodes 21, 22 are capacitively coupled to one another, the modulator 1 thus having a capacitively coupled coplanar travelling wave electrode design. Due to the capacitively coupled waveguide electrodes 21, 22 a first voltage +V/2 drops across the first capacitive segments 111 and an opposite voltage −V/2 drops across the second capacitive segments 121 ("push-pull-drive").

The n-doped region 3 is at least partially surrounded by an isolation groove 31 extending through the n-doped layer and thus electrically separating the n-doped region 3 from the coplanar lines 23, 24. For example, the n-doped region 3 has an essentially rectangular contour.

In operation, a high frequency (RF) voltage source 4 is coupled to the first and the second coplanar line 23, 24 such that a microwave travels along the coplanar lines 23, 24 and thus via the plurality of first and second waveguide electrodes 21, 22 along the optical waveguides 11, 12. The endings of the coplanar lines 23, 24 are terminated with a resistor 5.

Figure 2:
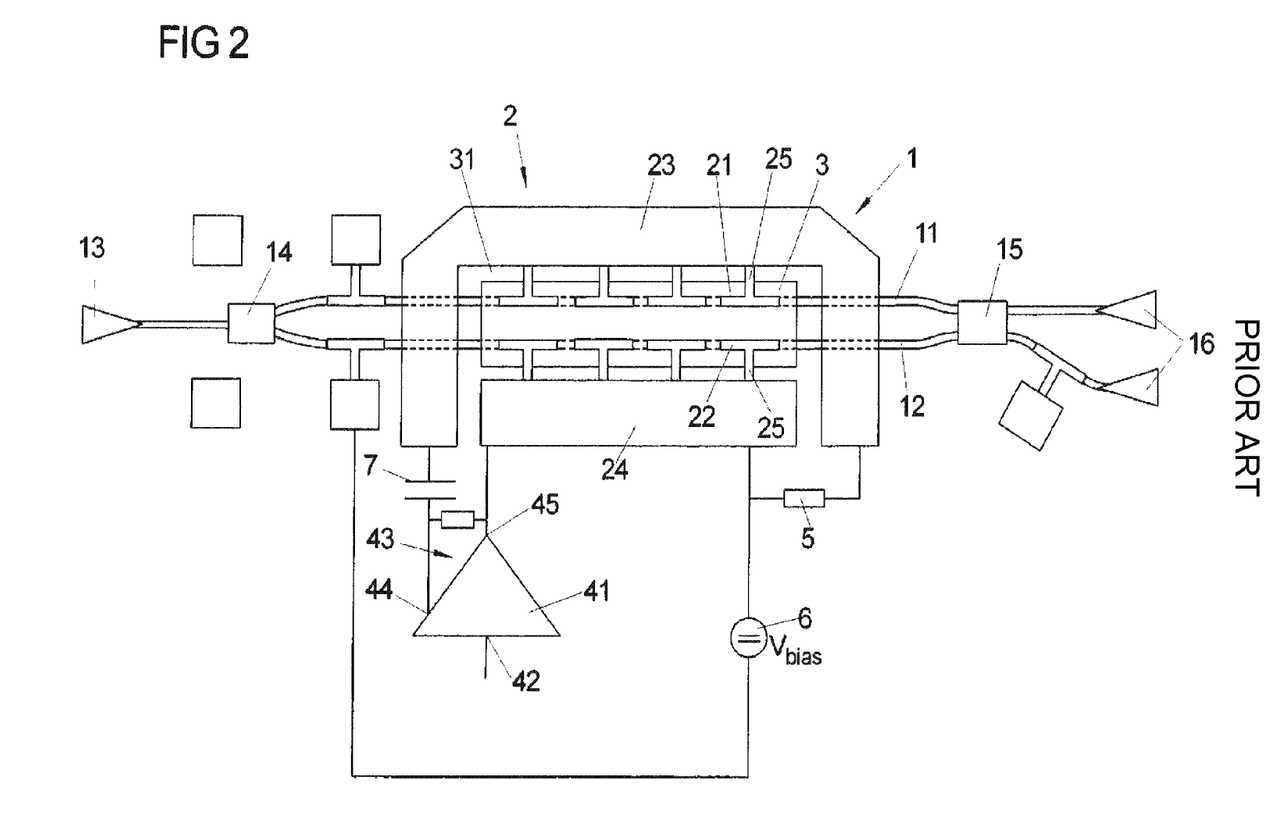
FIG. 2 illustrates the principal layout of a known Mach-Zehnder modulator—driver arrangement.
Figure 3:
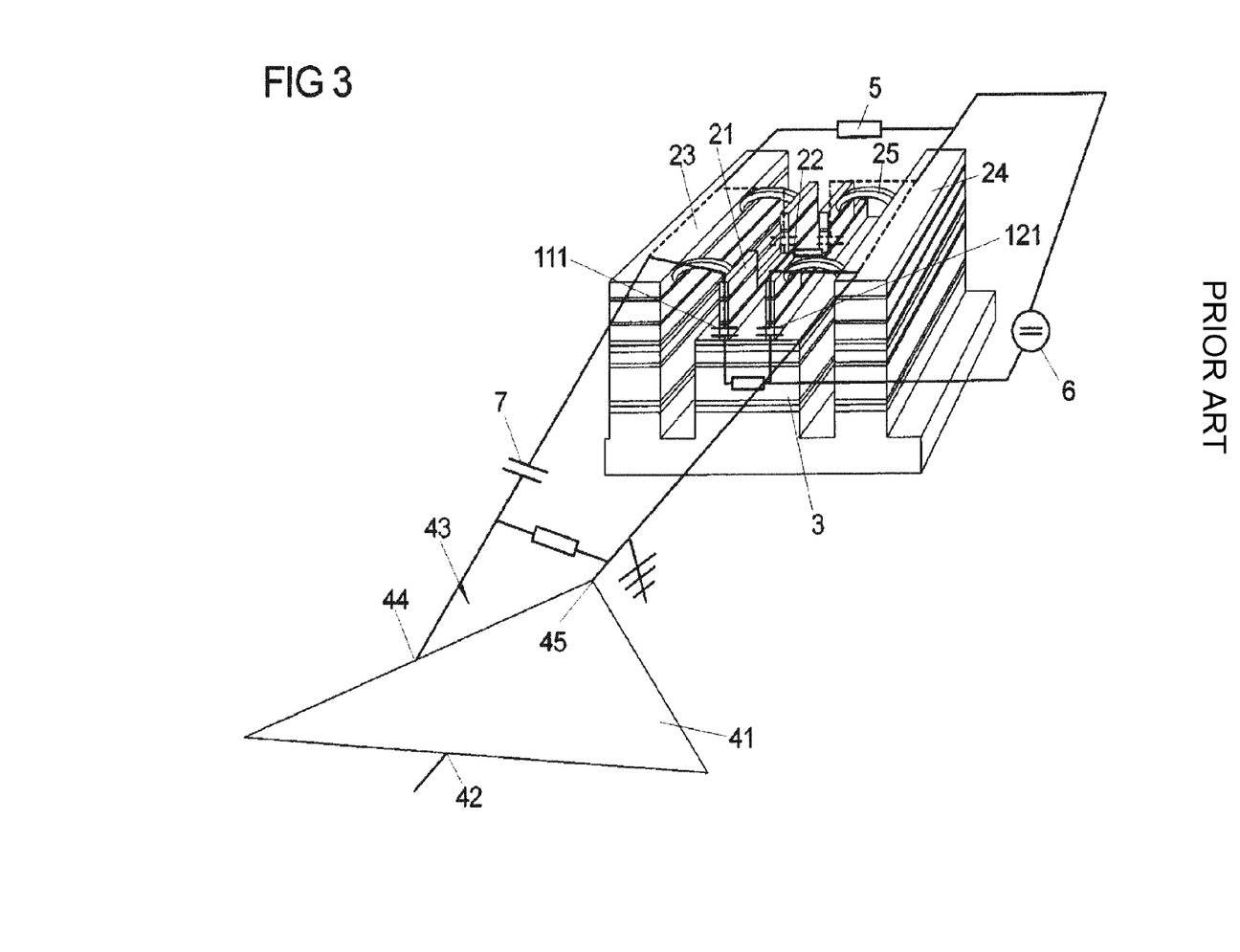
FIG. 3 depicts a perspective view of a known Mach-Zehnder modulator arrangement.

As shown in FIGS. 2 and 3, the high frequency voltage source 4 may comprise a driver unit 41 for amplifying a high frequency input signal supplied to the driver unit 41 via an input port 42. The conventional driver unit 41 shown in FIG. 2 comprises a single output port 43 having a first, non-grounded signal carrying connector 44 and a grounded second connector 45. The signal carrying connector 44 is connected to the first coplanar microwave line 23 and thus to the first waveguide electrode 21, whereas the grounded second connector 45 is connected to the second coplanar line 24 and thus to the second waveguide electrodes 22. The output port 43 of the driver unit 41 has an impedance that is matched to the impedance of the travelling wave electrode arrangement 2. Conventionally, the impedance of the output port 43 is 50 Ohm, i.e. the driver unit 41 and the modulator 1 are 50 Ohm devices, wherein the impedance of the modulator's travelling wave electrode arrangement 2 is designed to be 50 Ohm, the terminating resistor 5 has 50 Ohm as well as the input port 42 of the driver unit 41. Due to the grounding of the second coplanar line 24, the n-doped region 3 has a "floating" potential, i.e. its potential varies dependent on the voltage V applied to the first and the second waveguide electrodes 21, 22 such that the n-doped region 3 may create a stray capacitance against mass.

In order to be able to bias the capacitive segments (the p-i-n diodes) 111, 121 in reverse direction, a DC voltage can be applied between the n-doped region 3 and the second (grounded) coplanar microwave line 24 using a DC source 6. In order to prevent the DC voltage from entering the driver unit 41 via the output port 44 a capacitor 7 or a bias-T (not shown) is introduced between the connector 44 and the first coplanar microwave line 23.

Figures 4A, 4B:
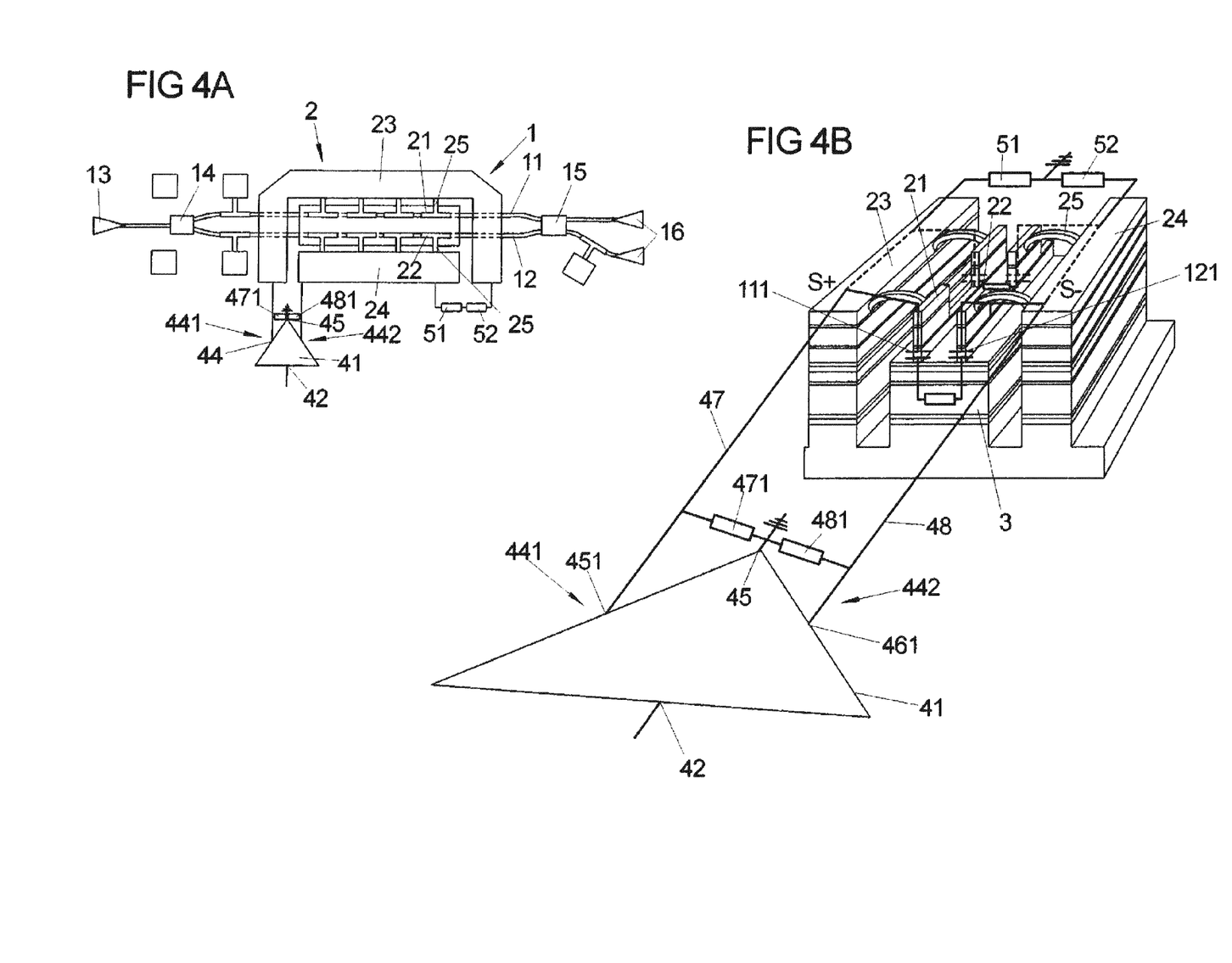
FIG. 4A schematically shows a top view of a Mach-Zehnder modulator arrangement according to an embodiment of the invention.
FIG. 4B shows a perspective view of the Mach-Zehnder modulator arrangement of FIG. 4A.

FIGS. 4A, 4B depict a Mach-Zehnder modulator arrangement according to an embodiment of the invention. The principle layout of the Mach-Zehnder modulator 1 is identical to the layout of the modulator shown in FIGS. 1 to 3. However, the driver unit 41 comprises a first and a second output port 441, 442 coupled to the first coplanar line and the second coplanar line 23, 24, respectively.

The impedance of the driver unit 41 at the first and the second output port 441, 442 is only half of the impedance of the travelling wave electrode arrangement 2. For example, if the impedance of the travelling wave electrode arrangement 2 is about 50 Ohm, the impedance at the first output port 441 is about 25 Ohm and the impedance at the second output port 442 is also about 25 Ohm. The first and the second output ports 441, 442 each comprise a first and second signal-carrying connector 451, 461, wherein the first connector 451 is coupled to the first coplanar line 23 (for example, via a high frequency connecting waveguide in the form of a microstrip line 47) and the second connector 461 is coupled to the second coplanar line 24 (for example, also via a microstrip line 48) such that none of the two coplanar lines 23, 24 is permanently grounded.

For example, the driver unit 41 is a differential driver for symmetrically driving the modulator such that a first signal (potential) in the form of a first voltage signal S+ is supplied to the first microwave line 23 via the first connector 451 and a second, inverse signal (potential) in the form of a second voltage signal S− is supplied to the second coplanar line 24 via the second connector 461. Thus, a first voltage V+ (corresponding to the voltage signal S+) drops at the first capacitive segments 111 and an opposite voltage (i.e. an opposite electrical field) V− drops at the second capacitive segments 121.

The impedance of the microstrip lines 47, 48 is chosen in each case to match the impedance of the output ports 441, 442 of the driver unit 41, i.e. to be at least essentially 25 Ohm (illustrated in FIG. 4B by resistor symbols 471, 481). It is noted that in pure symmetric differential drive operation the absolute value of the first voltage signal S+ is at least essentially identical to the absolute value of the second voltage signal S− (wherein the signals have opposite signs). However, it is also conceivable that the electrode arrangement 2 is not operated in a pure symmetric way such that the first and the second voltage signal have opposite signs but different absolute values or that the signal (potential) of the first and second waveguide electrodes is switched according to the electrode operation of the LVDS approach described above. For example, applying a first and a second voltage signal S+, S− that have different (non-zero) absolute values it may be possible to selectively control a chirp of the optical output of the modulator.

Figure 5:
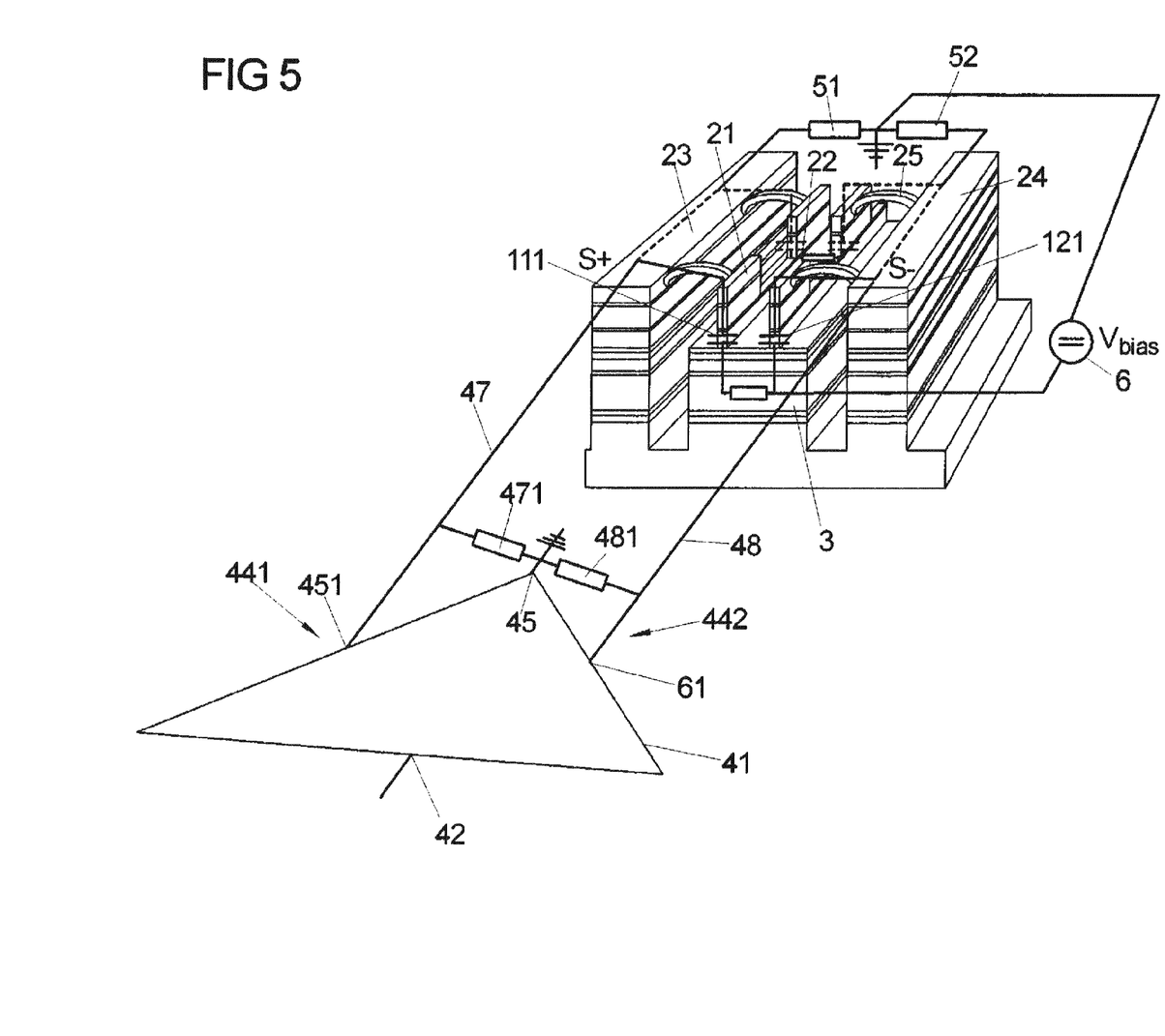
FIG. 5 shows a perspective view of a variant of the Mach-Zehnder modulator arrangement illustrated in FIGS. 4A and 4B.

Further, as shown in FIG. 5, a DC bias source 6 may be provided in order to supply a DC bias voltage $V_{bias}$ across the capacitive segments 111, 121, wherein the DC source 6 is connected to the n-doped region 3 and the microwave lines 23, 24 (via a connecting point between two terminating resistors 51, 52). The terminating resistors 51, 52 each have a resistance corresponding to half the impedance of the travelling wave arrangement, e.g. 25 Ohm each. In contrast to the conventional modulator arrangement, a DC blocking capacitor (such as capacitor 7 in FIG. 2) or a bias-T is not necessary as the capacitive segments 111, 121 inherently decouple the DC voltage supplied by DC source 6 from the driver unit 41 and the terminating resistors 51, 52. Further, although the n-doped region 3 is not connected to a mass connector 45 of the driving unit 41, the n-doped region 3 does not have a floating potential anymore due to the symmetric electrode operation. Rather, its potential may not vary during RF operation of the electrodes such that stray capacitances between the n-doped region 3 and mass may be eliminated or reduced.

Further, as the DC voltage source is connected to a connecting point between the two terminating resistors 51, 52 (having the same resistance value) the DC voltage is symmetrically supplied to the capacitive segments. This has the effect that a photo current created in the region of the capacitive segments will symmetrically flow across both resistors 51, 52 such that the DC voltage across the resistors 51, 52 will be the same, thereby eliminating a contribution of a chirp of the optical signal generated by the Mach-Zehnder modulator.

Figure 6:
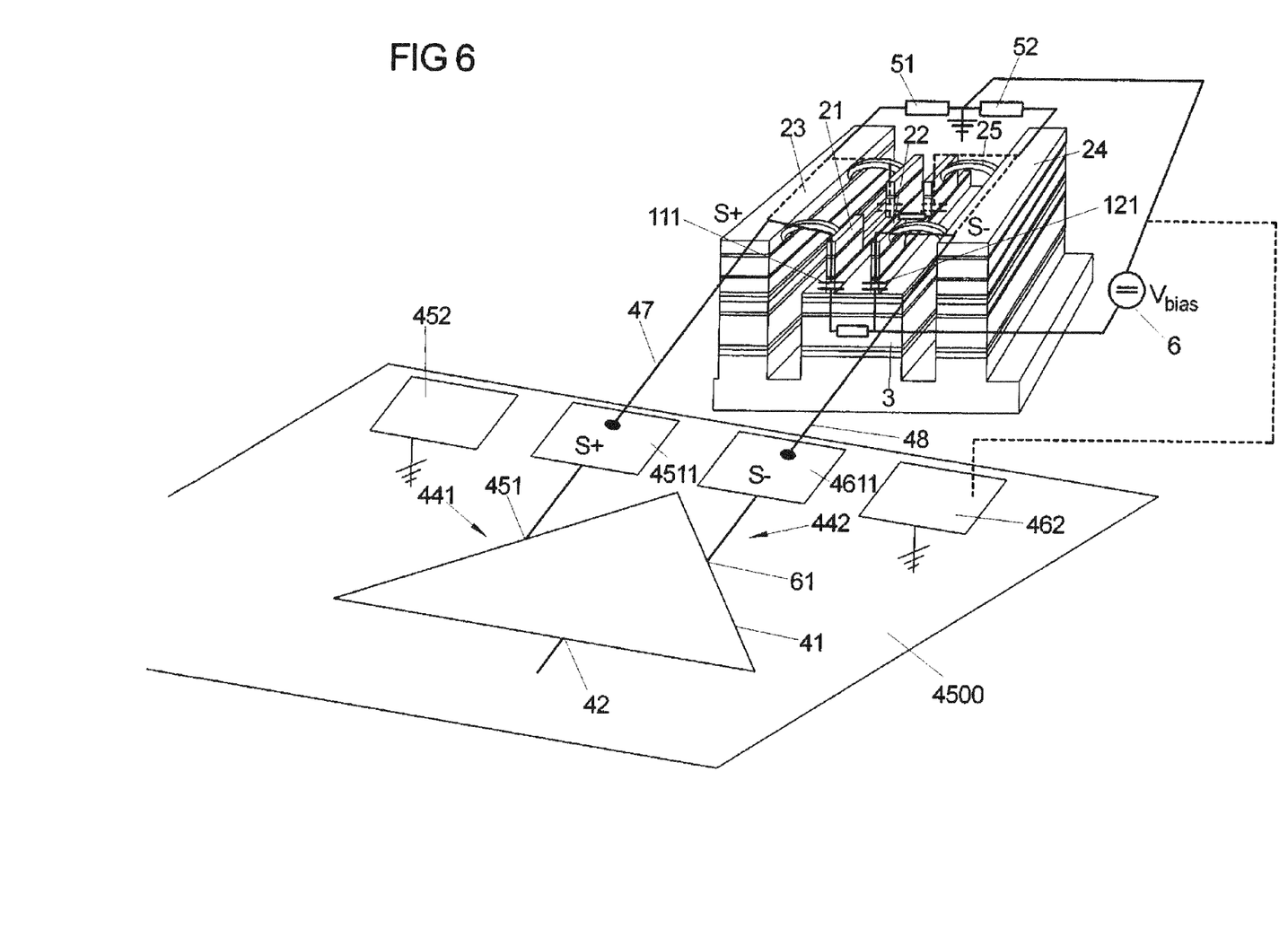
FIG. 6 shows another variant of the Mach-Zehnder modulator arrangement illustrated in FIGS. 4A and 4B.

FIG. 6 shows an example of a configuration of the driver unit 41 used in the modulator arrangement according to the invention. The first and the second output ports 45, 46 have a "ground-signal-signal-ground" configuration, wherein the signal carrying connectors 451, 461 of the first and the second output port 441, 442, respectively, are connected to the coplanar lines 23, 24 as shown in FIGS. 4A, 4B and FIG. 5. Also, the mass side of the DC source 6 may be connected to the mass of the driver unit 41 (as indicated by the dashed line in FIG. 6).

Further ground connectors 452, 462 connected to the ground may be provided, wherein the ground connectors 452, 462 may be realized as actual connectors such as contact pads. However, it is also possible that the ground connectors 452, 462 of the first and the second output port 441, 442 are provided by a general mass (common ground) of the driver unit 41 and/or the Mach-Zehnder modulator, for example, by a grounded substrate 4500 of the driver unit 41. Further, the first and second connector 451, 461 may comprise contact pads 4511, 4611 arranged on the substrate 4500, wherein the microstrip lines 47, 48 may be bonded to the contact pads 4511, 4611.

REFERENCE SIGNS

1 Mach-Zehnder modulator
2 Travelling wave electrode arrangement
3 n-doped region
4 high frequency source
5 terminating resistor
6 DC source
7 capacitor
11 first optical waveguide
12 second optical waveguide
13, 16 spot size converter
14 splitter
15 combiner
21 first waveguide electrodes
22 second waveguide electrodes
23 first coplanar line
24 second coplanar line
25 air bridge
31 isolation groove
41 driver unit
42 input port
43 output port
44 signal carrying connector
45 grounded connector
47, 48 microstrip line
51 terminating resistor
111 first capacitive segments
121 second capacitive segments
441 first output port
442 second output port
451 first signal-carrying connector
452, 462, 4511, 4611 contact pad
461 second signal-carrying connector
471, 481 impedance
4500 substrate

The invention claimed is:

1. A Mach-Zehnder modulator arrangement, comprising:
   at least one electro-optic Mach-Zehnder modulator comprising a first optical waveguide forming a first modulator arm and a second optical waveguide forming a second modulator arm;
   a travelling wave electrode arrangement comprising a plurality of first waveguide electrodes for applying a voltage across the first optical waveguide and a plurality of second waveguide electrodes for applying a voltage across the second optical waveguide, wherein the first waveguide electrodes are capacitively coupled to the second waveguide electrodes; and
   a driver unit for supplying an alternating voltage to the travelling wave electrode arrangement, wherein
   the driver unit comprises a first output port coupled to the first waveguide electrodes and a second output port coupled to the second waveguide electrodes, wherein the driver unit is configured to supply a first varying signal to the first waveguide electrodes via the first output port and to supply a second varying signal to the second waveguide electrodes via the second output port, wherein the impedance of the driver unit at each one of the two output ports is essentially half of the impedance of the travelling wave electrode arrangement.

2. The Mach-Zehnder modulator arrangement as claimed in claim 1, wherein the impedance of the travelling wave electrode arrangement is in the range between approximately 46 Ohm to approximately 54 Ohm or is approximately 50 Ohm.

3. The Mach-Zehnder modulator arrangement as claimed in claim 1, wherein the driver unit comprises an input port, wherein the impedance of the driver unit at the input port is approximately 50 Ohm.

4. The Mach-Zehnder modulator arrangement as claimed in claim 1, wherein the driver unit is a differential driver unit configured in such a way that the first and the second signal supplied to the first and second waveguide electrodes, respectively, have opposite polarity.

5. The Mach-Zehnder modulator arrangement as claimed in claim 1, further comprising a first and a second electrical line extending at least partially parallel to the first and second optical waveguide, wherein the first and the second output port of the driver unit are coupled to the plurality of first and second waveguide electrodes via the first and second electrical line, respectively.

6. The Mach-Zehnder modulator arrangement as claimed in claim 5, wherein the first and the second electrical line are formed as coplanar microwave strip lines.

7. The Mach-Zehnder modulator arrangement as claimed in claim 5, wherein the first and/or the second output port of the driver unit is connected to the first or second electrical line via a high frequency connecting waveguide.

8. The Mach-Zehnder modulator arrangement as claimed in claim 1, wherein the first and the second waveguide electrodes are arranged on top of capacitive segments of the optical waveguides.

9. The Mach-Zehnder modulator arrangement as claimed in claim 8, wherein the capacitive segments of the first optical waveguide are coupled to the capacitive segments of the second optical waveguide via a conductive region arranged on a side of the capacitive segments that faces away from the waveguide electrodes.

10. The Mach-Zehnder modulator arrangement as claimed in claim 9, wherein the Mach-Zehnder modulator is formed as a semi-conductor device, and wherein the conductive region is formed by an n-doped semiconductor layer.

11. The Mach-Zehnder modulator arrangement as claimed in claim 8, further comprising a DC-source connected to the first and/or the second electrical line and the conductive region for supplying a bias voltage across the capacitive segments of the optical waveguides.

12. The Mach-Zehnder modulator arrangement as claimed in claim 1, wherein the driver unit and/or the Mach-Zehnder modulator comprise a grounded substrate.

13. The Mach-Zehnder modulator arrangement as claimed in claim 8, wherein the capacitive segments each form a p-i-n diode, an n-i-n diode or a Schottky diode.

14. A method for operating a Mach-Zehnder modulator arrangement, comprising:
   providing at least one electro-optic Mach-Zehnder modulator comprising a first optical waveguide forming a first modulator arm and a second optical waveguide forming a second modulator arm;
   providing a travelling wave electrode arrangement comprising a plurality of first waveguide electrodes for applying a voltage across the first optical waveguide and a plurality of second waveguide electrodes for applying a voltage across the second optical waveguide, wherein the first waveguide electrodes are capacitively coupled to the second waveguide electrodes; and
   supplying, via a first output port, a first varying signal to the first waveguide electrodes and supplying, via a second output port, a second varying signal voltage to the second waveguide electrodes, wherein the impedance at each one of the two output ports is essentially half of the impedance of the travelling wave electrode arrangement.

* * * * *